Aug. 4, 1953  R. W. NEWBILL, JR  2,647,399
TEST PAD
Filed Nov. 22, 1949
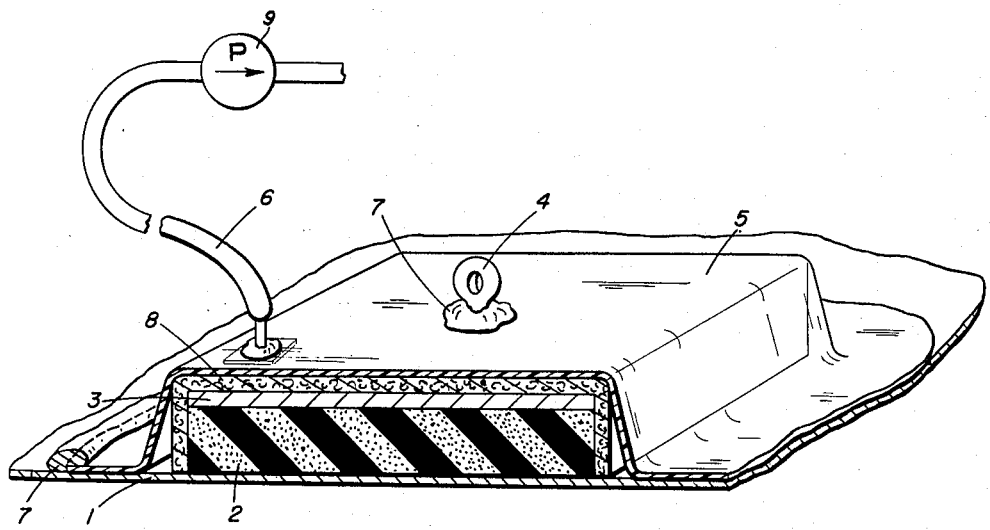
INVENTOR.
ROBERT W. NEWBILL JR.
BY *William R. Lane*
ATTORNEY Patented Aug. 4, 1953

2,647,399

UNITED STATES PATENT OFFICE 2,647,399

TEST PAD

Robert W. Newbill, Jr., San Fernando, Calif., assignor to North American Aviation, Inc.

Application November 22, 1949, Serial No. 128,854

4 Claims. (Cl. 73—88)

This invention relates to the static testing of aircraft and especially to the application of loads simulating pressure distribution on wings, fuselages, canopies and other parts of an aircraft.

In order to simulate in the static test of an aircraft the distributed loadings present during flight, it is necessary to apply loads normal to the skin of the aircraft. Where these loads are directed onto the aircraft no problem results because sandbags or padded weights may be used to simulate the pressure of air on the aircraft during flight. However, where it is required to simulate a vacuum or negative pressure on the aircraft, as for instance that which occurs on the upper surface of a wing or canopy when the aircraft is in normal flight attitude, some method must be found for applying a pull on the structure normal to the surface thereof. It is an object of this invention to provide apparatus for applying distributed load of the latter type to an aircraft.

It is another object of this invention to provide means for securing loading pads to the surface of an aircraft so that they may be capable of applying a negative pressure to the surface thereof.

It is another object of this invention to provide means for attaching foam rubber loading pads to the surfaces of an aircraft without the use of cementing weights.

Other objects of invention will become apparent from the following description taken in connection with the accompanying single figure which is a sectional prospective embodying the invention.

Referring to the single figure, a section 1 of an aircraft wing, canopy or fuselage is shown with a loading pad comprising foam rubber body 2 and metallic backup plate 3 equipped with a loading eye bolt 4. Suction sheet 5 covers the entire pad except for loading eye bolt 4, and is equipped with suction connector 6 adapted to be connected to a vacuum pump 9. Felt cushioning pad 8 separates backup plate 3 from suction sheet 5 to prevent rupture of the sheet on the corners of the plate. The edges of suction sheet 5 are secured to member 1 by zinc chromate cement 7. Zinc chromate cement is also applied to the intersection of loading eye bolt 4 and suction sheet 5 to prevent leakage.

Metallic backup plate 3 is pre-shaped to correspond to the general contour of the part of the aircraft at which the negative pressure load is to be applied. The surface of aircraft member 1 is carefully cleaned and at least one coating of rubber cement is applied both to foam rubber pad 2 and the surface of member 1. After these coatings have dried for a period of approximately 30 minutes, or for such a period as will allow at least partial drying of the cement, the pads are placed in position with foam rubber layer 2 in contact with member 1 of the aircraft, and thin flexible suction sheet 5 which is preferably of polyvinyl alcohol is placed over the pad with a strip of zinc chromate (shown at 7 in the figure) around the edges of the sheet. The zinc chromate serves to seal the sheet against member 1. A vacuum pump 9 is then attached to suction connector 6, and the space beneath suction sheet 5 is evacuated. Atmospheric pressure is therefore applied to the outside of the pad, forcing the pad into intimate connection with member 1. If a substantial load needs to be applied to a portion of the aircraft, represented by 1 in the single figure, the cement coating between foam rubber layer 2 and member 1 is allowed to dry, thus giving a secure structural connection to member 1. In that case, suction sheet 5 may be removed before a tension load is applied to loading eye bolt 4. Since polyvinyl alcohol is soluble in water, the sheet may be readily removed by application of water. However, in cases where a quick area test is necessary or where a single pad has become disconnected through some inadvertence or accident, a satisfactory tension load may be applied to sheet member 1 without the use of any cement or glue between member 1 and foam rubber layer 2 simply by the continual application of vacuum to suction connector 6. The use of vacuum or, more strictly, the use of atmospheric pressure to achieve the firm attachment between the loading pad and the surface to be loaded is much to be preferred over the use of heavy lead weights because it applies no net load to the structure as does a dead weight, and hence may be used on relatively delicate parts of the aircraft such as the canopy. Where a large number of tension test loads are to be applied over an area of aircraft structure, a single suction sheet may be applied over all the pads, and the procedure hereinbefore described may be followed to secure all pads to the structure simultaneously with but a single application of vacuum.

In instances where polyvinyl alcohol is not desirable, sheets of polyvinyl material such as polyvinyl chloride or other suitable material may be used.

Although the invention has been described and illustrated in detail, it is to be clearly understood that the same is by way of illustration and ex-

I claim:

1. Means for applying a tension static test load normal to an aircraft panel structure comprising a metal plate, a sponge rubber pad attached to said plate and adapted to fit intimately against said panel, a thin flexible suction sheet member larger than said metal plate adapted to be sealingly attached to said panel around said plate and pad and equipped with a suction connector for attachment to a source of vacuum, means attached to said plate and sealed through said sheet for applying a tension load to said pad, a resilient sheet of material separating said metal plate and said flexible sheet material and means for evacuating the space under said suction sheet through said suction connector whereby a tension force applied to said tension loading means is transmitted to said panel structure.

2. Means for applying a tension force normal to a shell structure comprising a rigid plate having substantially the same curvature as said structure, a resilient backing pad attached to said plate to fit against said structure, a thin flexible sheet member larger than said rigid plate adapted to be sealingly attached to said panel around said plate and pad, and gripping means attached to said plate and sealed through said sheet for applying a tension load to said plate, cushioning means separating said sheet from said plate and means for evacuating the space under said sheet whereby a tension force applied to said tension loading means is transmitted to said structure.

3. Means for attaching to an aircraft panel structure a test pad composed of a metal plate and a layer of resilient material attached to said plate and adapted to fit intimately against said panel, a thin flexible sheet adapted to be sealingly attached to said panel and said test pad, sheet protecting means separating said test pad from said sheet, said sheet being provided with a suction connector for attachment to a source of vacuum for evacuating the space under said sheet to thereby cause said resilient material to be forced into attaching relationship with said panel by atmospheric pressure.

4. Means for applying a tension static test load to an aircraft panel comprising pad means adapted to fit intimately against said panel, a thin flexible sheet member adapted to be sealingly attached to said panel around said pad means, means attached to said pad means for applying a tension load thereto, and means for evacuating the space under said sheet, said means being provided with a suction connector for attachment with a source of vacuum whereby when said space has been evacuated said pad means is held in engagement with said panel by atmospheric pressure whereby a tension force applied to said tension loading means is transmitted to said panel.

ROBERT W. NEWBILL, Jr.

References Cited in the file of this patent

UNITED STATES PATENTS

| Number | Name | Date |
|---|---|---|
| 2,151,584 | Bugatti | Mar. 21, 1939 |
| 2,246,662 | Bloomberg | June 24, 1941 |
| 2,319,675 | Grinter | May 18, 1943 |
| 2,397,827 | Williams | Apr. 2, 1946 |
| 2,413,737 | Weaver | Jan. 7, 1947 |
| 2,441,097 | Hicks | May 4, 1948 |